(12) United States Patent
Bustamante et al.

(10) Patent No.: US 11,838,580 B2
(45) Date of Patent: Dec. 5, 2023

(54) INSERTION OF TARGETED CONTENT IN REAL-TIME STREAMING MEDIA

(71) Applicant: Phenix Real Time Solutions, Inc., Chicago, IL (US)

(72) Inventors: Fabián E. Bustamante, Evanston, IL (US); Stefan Birrer, Chicago, IL (US); Nicholas Los, Chicago, IL (US)

(73) Assignee: Phenix Real Time Solutions, Inc., Chicago, IL (US)

( * ) Notice: Subject to any disclaimer, the term of this patent is extended or adjusted under 35 U.S.C. 154(b) by 0 days.

(21) Appl. No.: 17/465,581

(22) Filed: Sep. 2, 2021

(65) Prior Publication Data

US 2022/0078514 A1 Mar. 10, 2022

Related U.S. Application Data

(60) Provisional application No. 63/074,902, filed on Sep. 4, 2020.

(51) Int. Cl.
| | | |
|---|---|---|
| *H04N 21/234* | (2011.01) | |
| *H04N 21/258* | (2011.01) | |
| *H04N 21/2668* | (2011.01) | |
| *H04N 21/475* | (2011.01) | |
| *H04N 21/61* | (2011.01) | |
| *H04N 21/658* | (2011.01) | |
| *H04L 65/75* | (2022.01) | |
| *H04L 65/756* | (2022.01) | |
| *H04N 21/44* | (2011.01) | |
| *G06Q 30/0251* | (2023.01) | |
| *H04N 21/81* | (2011.01) | |
| *H04N 21/45* | (2011.01) | |
| *H04L 65/612* | (2022.01) | |
| *H04L 67/52* | (2022.01) | |
| *H04L 67/568* | (2022.01) | |

(52) U.S. Cl.
CPC ... *H04N 21/44016* (2013.01); *G06Q 30/0261* (2013.01); *G06Q 30/0269* (2013.01); *H04L 65/612* (2022.05); *H04L 67/52* (2022.05); *H04L 67/568* (2022.05); *H04N 21/4532* (2013.01); *H04N 21/812* (2013.01)

(58) Field of Classification Search
CPC ....................... H04N 21/23424; H04N 21/812
See application file for complete search history.

(56) References Cited

U.S. PATENT DOCUMENTS

| | | | | |
|---|---|---|---|---|
| 7,945,573 | B1 * | 5/2011 | Barnes | ............... G06Q 30/02 707/705 |
| 2010/0037253 | A1 * | 2/2010 | Sheehan | ............ H04N 21/2668 725/35 |

(Continued)

*Primary Examiner* — Hsiungfei Peng
(74) *Attorney, Agent, or Firm* — Perkins Coie LLP; Alberto Araiza

(57) ABSTRACT

A method for targeted content insertion in real-time streaming. The method leverages the different ordered signals available on a multi-step process that clients follow when subscribing to a real-time media (video and/or audio) stream including selecting a region, connecting to a control channel, and subscribing to a stream to guide a multi-stage process of content selection, transcoding, and insertion in a real-time media stream. A system is also specified for implementing the described method on a real-time streaming architecture.

19 Claims, 7 Drawing Sheets

(56) References Cited

U.S. PATENT DOCUMENTS

2013/0014151 A1\* 1/2013 Tallapaneni ..... H04N 21/44204
                                                                                  725/23
2014/0226671 A1   8/2014 Broome et al.
2019/0266646 A1\* 8/2019 Milford .............. G06Q 30/0244
2019/0313135 A1\* 10/2019 Pathak ............... H04N 21/8586

\* cited by examiner

INSERTION OF TARGETED CONTENT IN REAL-TIME STREAMING MEDIA

CROSS-REFERENCE TO RELATED APPLICATION

This application claims the benefit of U.S. Provisional Patent Application No. 63/074,902, titled "Method and System for Ad Insertion in Real-Time" and filed Sep. 4, 2020, which is incorporated herein by reference in its entirety.

TECHNICAL FIELD

The disclosed teachings relate to streaming media. More particularly, the disclosed teachings relate to inserting content in real-time streaming media.

BACKGROUND

Streaming media is by far the dominant application-traffic on the Internet. For a typical media streaming service, video and/or audio data is streamed as a sequence of packets from a collection of servers to a number of client devices. The individual client devices are receivers that can playback multimedia received over, for example, the Internet. Currently, most media streaming focuses on video on demand (VoD) or "live" video streaming (e.g., Apple HTTP Live Streaming (HLS)), which requires a relatively large buffer to collect packets at the client device before playback.

A non-real-time streaming service has a high tolerance for "stream lag," which refers to the time from when an event that is streamed (or a specific action within it) takes place to the time when the streamed event is delivered to client devices. For live multimedia streaming, as provided by solutions such as Apple's HLS, stream lags of 10s of seconds are not uncommon and are generally considered acceptable. For VoD, where users can access video entertainment at arbitrary times (i.e., without the constraints imposed by a typical static broadcasting schedule), the stream lag can be thought of as virtually infinite.

BRIEF DESCRIPTION OF THE DRAWINGS

Detailed descriptions of implementations of the present invention will be described and explained through the use of the accompanying drawings.

Figure 1:
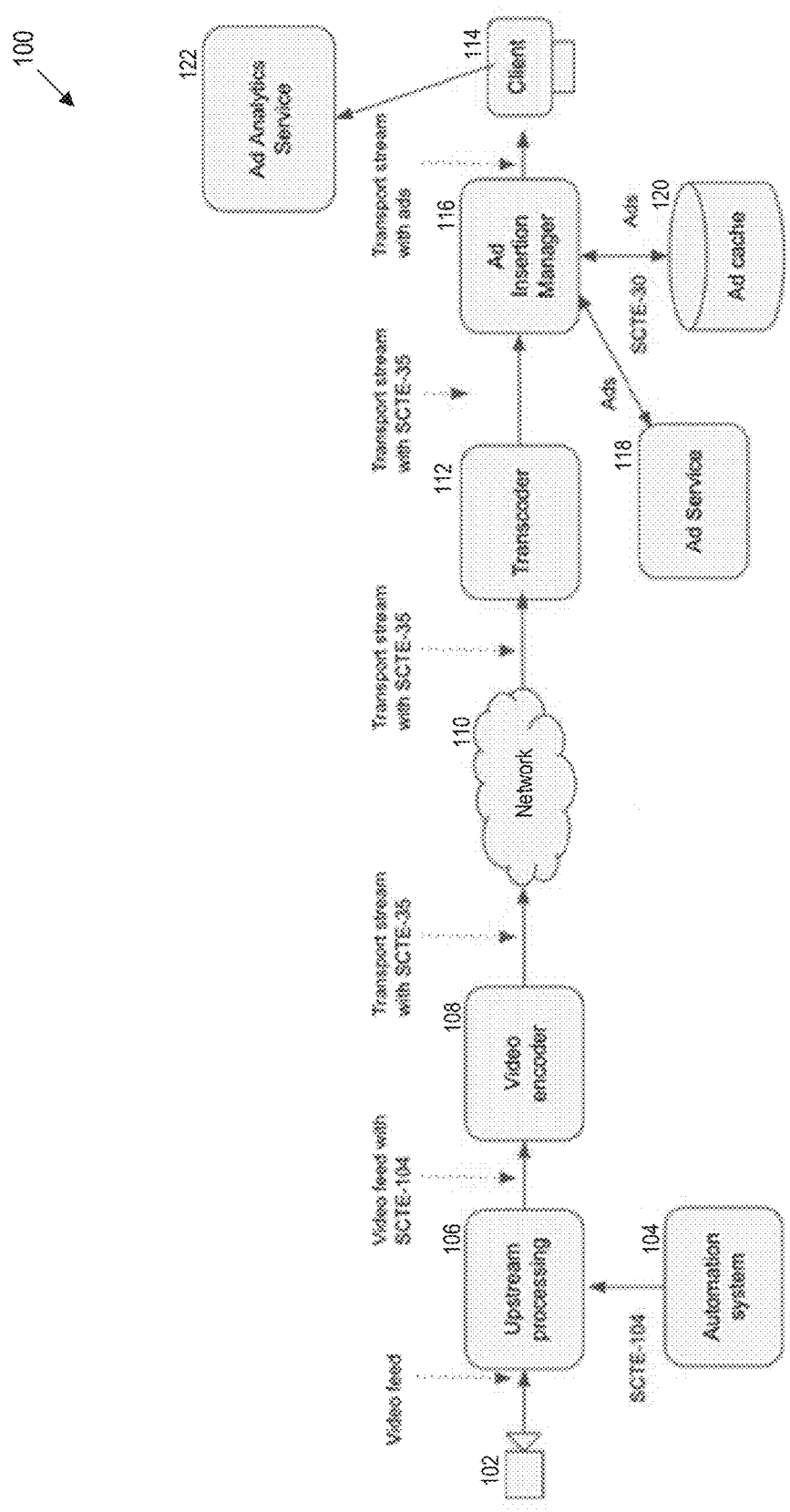
FIG. 1 illustrates a system including hardware and software components configured to insert content in real-time streaming media.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying embodiments.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list. For the sake of understanding, multiple details are provided to ensure thorough understanding of the embodiments. It is apparent to one skilled in the art, however, that the embodiments may be practiced without these specific details or with an equivalent arrangement. In other instances, well-known structures and devices are shown in block diagram form in order to avoid unnecessarily obscuring the embodiments.

The disclosed technology relates to real-time media streaming over packet switched networks such as the Internet. Real-time media streaming includes online streaming of media simultaneously recorded and broadcast "as it happens" to one or more users, with latencies sufficiently small as to enable natural interaction between participants. The disclosed technology includes technology for inserting content (e.g., advertisements) in a streaming service, where the content can be targeted for particular viewers. That is, the technology enables insertion of advertisements ("ads") in a real-time media stream to reach consumers based on various consumer attributes such as a demographic, geographic location, past preferences, and past behaviors.

The terms "real-time media stream" or "real-time streaming media" refer broadly to broadcasting an event on a network as it happens. This may include content that is captured or generated by a source device, broadcast over a network, and rendered by a receiving device with a latency that is unperceivable by a user of the receiving device, which also may be referred to as "live" or "near real-time." Examples of such a latency that is unperceivable by a user of a device can include 100 ms, 300 ms, 500 ms, etc. Accordingly, users of client devices in a broadcast group can interact with or respond to the live media stream in real-time (i.e., with a delay that is unperceivable to the users of the client devices in the broadcast group).

As such, content is simultaneously captured and broadcast "as it happens" to one or more user devices, with sufficiently small stream lag as to enable "natural" interactions by users of client devices, allowing the participants to react to and/or interact with the content and with other participants subscribed to the same media stream in "real-time." Thus, the definition of "real-time," "live," or "near real-time" is not stated in terms of specific latency thresholds (e.g., less than 0.5 seconds) but more generally in terms of supporting natural user interactivity. In an illustrative example, participants subscribing to a real-time streamed show could directly communicate with and steer actions of a performer (e.g., interacting with the performer in a standup comedy show, perhaps responding to questions). In another example, players in a streaming real-time game of cards could place bets while cards are being turned.

To provide real-time streaming content to various client devices, a streaming device such as a server can generate a media stream and transmit the media stream over a network to the client devices. Live media streaming requires the use of a codec to compress (e.g., encode) the media and requires using a transport protocol to transport the encoded media over the network. Examples of video compression standards include AVC H.264, H.265, VP8 and VP9. Examples of transport protocols include RTSP/RTP, RTMP, and Apple HLS. Before a content element (e.g., ad element, ad segment) can be inserted into a given media stream, it may need to be transcoded (converted) to a format that is appropriate for the stream (e.g., H.264) and for the client device that will render the media stream. A content element can include an image, audio, video, text, or combinations thereof. As indicated earlier, a content element can include or correspond to ad content.

A real-time media stream can include at least one key frame (e.g., data encoded for rendering a complete frame by a client device) and a number of predictive or delta frames that represent differences relative to the key frame. The media stream can include a bitrate that represents a number of bits for the frame of video, where an increased bitrate represents a greater definition of the associated media (e.g., high definition video). For a new client device to subscribe to streaming media, the client device processes a key frame to render a frame of media. Once the key frame is rendered, the client device can process the subsequent prediction frames to render and output a series of frames of the media.

In one example, a series of key frames and prediction frames may be disposed along a media stream at various times. Examples include intra-frames and inter-frames in VP8, respectively, and key frames and P-frames in Moving Picture Experts Group (MPEG), respectively. Key frames can be decoded without reference to any other frame in a sequence; that is, the decoder reconstructs such frames beginning from a default state. Key frames provide random access (or seeking) points in a media stream. Prediction frames are encoded with a reference to prior frames, specifically all prior frames up to and including the most recent key frame. Generally, correct decoding of a predictive frame depends on correct decoding of a most recent key frame and all ensuing predictive frames. Consequently, a decoding algorithm is not tolerant of dropped key frames. For example, in an environment in which frames may be dropped or corrupted, correct decoding is not possible until a key frame is correctly received. Moreover, a content element such as an ad is typically inserted in a real-time media stream at or relative to a key frame.

The insertion of a content element in a delivery stream can be based on the SCTE-104 and SCTE-35 standards. The Society of Cable Telecommunication Engineers (SCTE) developed and published SCTE-35, the standard that defines the MPEG format stream splicing (insertion) for digital program insertion in transport streams and newer adaptive bitrate (ABR) delivery formats such as HLS. SCTE 35 defines messages that allow a multiple-system operator (MSO) to insert different content types, including but not restricted to ads, into a video stream. The video stream is extended with markers that delimit the content elements, as defined in SCTE-104, and an encoder converts the video into a compressed bit-stream with the markers translated into compressed stream markers as defined by SCTE 35. A splicer reads the markers, contacts a content server (e.g., advertisement server) by, for example, using SCTE-30 protocol to request content elements, and splices the content elements in the correct place in the transport stream.

The insertion of content such as an ad (sometimes referred to as "ad insertion" (AI)) in a delivered stream can be done either at the client side (CSAI) or server side (SSAI). With CSAI, a stream and inserted content can arrive at the client device through different connections. The client device includes logic to perform the insertion at marked splice events. With SSAI, an inserted content is included in the stream at marked splice events, at a server upstream. Advantages of CSAI include ease and flexibility to deliver video-based inserted content to the end device separate from primary content. The delivered content could be targeted to a set of features such as a viewer's demographics, location and past behavior. In addition, it is generally easier to create an ad-playback event in CSAI. On the other hand, SSAI has advantages over CSAI such as reducing the effectiveness of ad blocking, making possible simpler and easier to port client logic, and imposing lower demands on a client device's resources as a result of the simpler logic. In one example, traditional television typically uses SSAI to insert ads on a regional basis and broadcasts the resulting stream to all viewers in a given region. Prior ad-related solutions for Internet streaming systems focus on the problem of ad caching and selection for video on demand (VOD) broadcasting and other non-real-time services.

The disclosed technology relates to server-side insertion of targeted content in real-time streaming media over packet switched networks (e.g., the Internet). The solution improves over existing technologies by addressing the challenges of selecting, transcoding, and inserting targeted content in a real-time media stream at a sufficient pace so as not to deteriorate the quality of the real-time streaming. Specifically, while a streaming service operator controls, to a certain degree, the timing of events on its platform, the service operator generally lacks control over the timing of a content insertion process, which can vary widely, with ranges of several seconds. Considering the timing demands of real-time media streaming, the service operator must decide between inserting an ad that is targeted for a specific viewer and session (e.g., "targeted" content), which can potentially arrive too late for transcoding and insertion or, alternatively, inserting a potentially less effective but timely obtained generic ad. Even more problematic, the streaming service operator lacks a framework to decide if or when it is "too late" for timely splicing in a targeted ad and an alternative response when that is the case. That is, the service operator lacks a framework of thresholds for deciding whether to insert alternative types of inserted content.

The disclosed technology extends an ordered process for subscribing a client device to a real-time media stream so that targeted content can be inserted therein. As such, the content insertion process extends an ordered sequence of multiple signals associated with processes performed for a client device to subscribe to a real-time media stream. More specifically, the multiple signals drive the sequential process of content selection, transcoding, and insertion. That is, a server can use the multiple signals that a client device follows when subscribing to a real-time stream to guide the process of selecting a set of potential content elements from one or more sources (e.g., third-party ad services or a system-wide cache), caching a subset of the potential content elements at a point of presence (PoP) such as a termination point in the IP network geographically close to the viewer, transcoding a subset of the cached content elements for insertion, and inserting a subset of the transcoded content element in the live media stream. Thus, in an ad insertion implementation, a set of ads are selected from one or more sources, a subset of those ads are stored in a cache memory at a PoP close to viewers, cached ads are transcoded for insertion, and transcoded ads are inserted in real-time media streams.

FIG. 1 illustrates a system including hardware and software components configured to insert content elements in real-time media streams. As shown, one or more publishers 102 upload media streams. The media streams embed one or more tags that each indicate an opportunity to insert a content element at a location in the media stream indicated by the tag (e.g., cue-in or cue-out points). An automation system 104 can insert a content element in accordance with the tag during upstream processing 106 of the real-time media stream before being encoded by an encoder 108 and transmitted over the network 110. At the PoP, a transcoder 112 can transcode the encoded stream before delivering to the client device 114. In the illustrated implementation, an Ad Insertion Manager 116 operates the logic of the embodiments described herein, requests content elements from one or more services such as the ad service 118, splices the transcoded ad received at a splice point of the real-time media stream, and delivers the transport stream with the embedded content element to the client device 114.

In one example, a real-time media stream has metadata that describes a programming structure (e.g., marked splice events) and ad elements have metadata that describe categories of desired recipients of particular ads (e.g., ages between 18-25, income greater than $50,000) and client devices (e.g., type of device, geographic location). The criteria requirements of splices, ads, viewer, and client device are used to select a targeted ad for insertion in the real-time media stream. The matching ad that satisfies the criteria is transcoded and inserted in the real-time media stream at the PoP of the scriber. In one example, transcoded ads are cached at the ad cache 120 for later use in other media streams or for other subscribers. Information of ad viewing, collected at the client device 114, is delivered to the Ad Analytics 122 for later processing to generate analytics (e.g., whether ads were successfully delivered in real-time media streams and/or viewed by targeted viewer users).

The process illustrated in system 100 assumes that an ad that was requested from the Ad Insertion Manager 116 can arrive and be transcoded within a threshold time to allow for inserting the ad in the real-time media stream without causing delays in delivering the real-time media stream to the client device 114. As indicated earlier, however, a streaming service operator generally has little or no control over the timing of the ad insertion process. In addition, transcoding of an ad can be delayed due to the presence of concurrent processes that are resource intensive, which can further prohibit inserting targeted content in a real-time media stream.

The disclosed technology allows a streaming service operator to orchestrate a process of selection, transcoding, and splicing of a content element that is targeted for a particular viewer or session and within a given time. In some embodiments, there are many possible content elements to select from based on, among other factors, a specific demographic of the subscriber viewer, the client device in use, and a time available for content insertion. In general, targeted ads that are highly specific (e.g., for a 40-50 year-old male in the Chicago area) are preferred to generic ads that are less specific (e.g., for anyone in the Chicago area).

Figure 2:
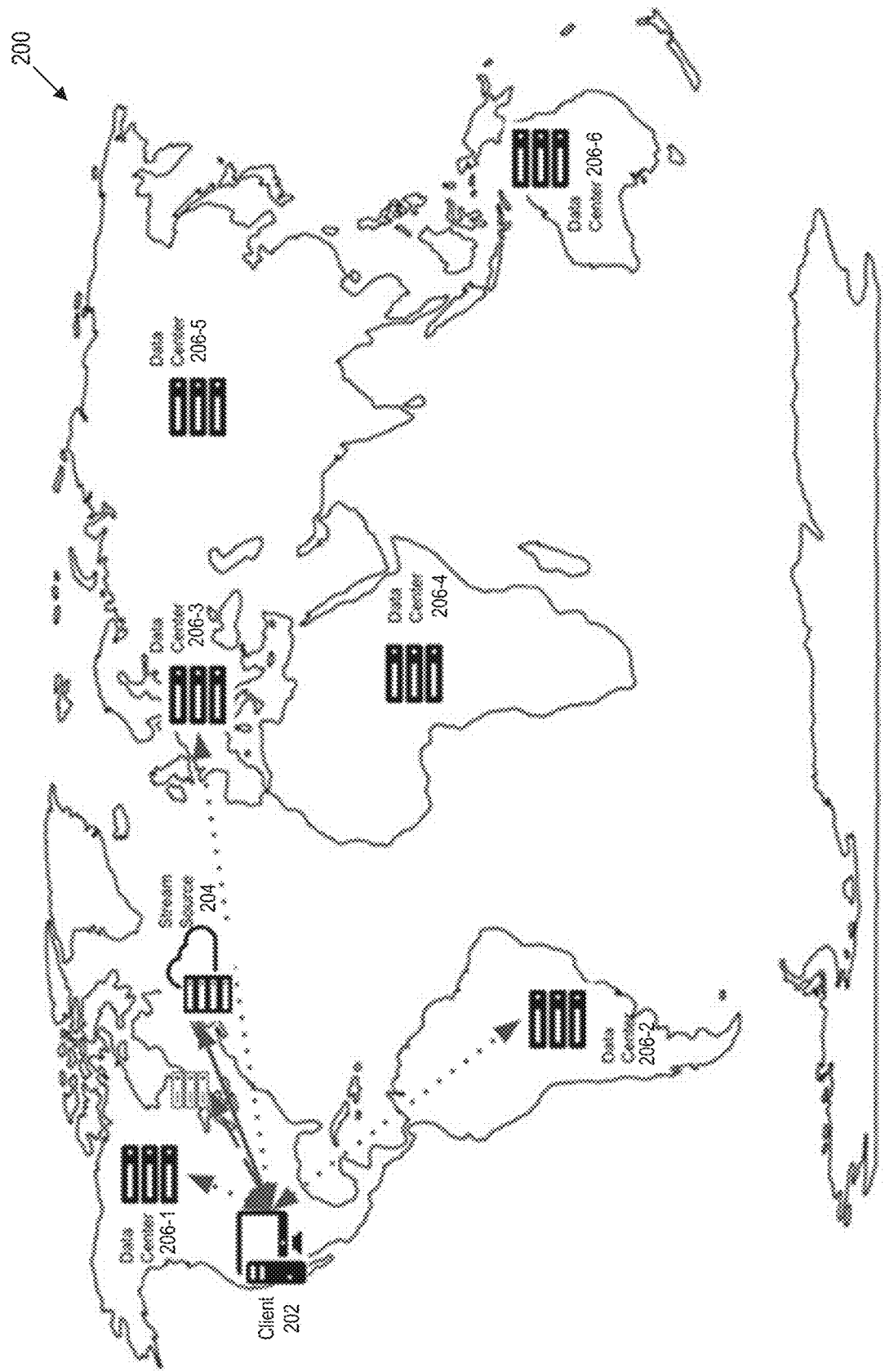
FIG. 2 illustrates an architecture of a system spread across the world.

The disclosed technology assumes that it is possible to cache selected and transcoded content elements at datacenters of PoPs associated with different geographic locations. For example, FIG. 2 illustrates an architecture of a system 200 spread across the world. As shown, a client device 202 is in communication with a media stream source 204 to request and receive real-time media streams. The stream source 204 is a media streaming serving infrastructure to which publishers and subscribers can connect. The client device 202 can also communicate with data centers having PoP in common with the client device. As shown, there are multiple data centers 206-1 through 206-6 (collectively referred to as "data centers 206") around the world. Once a data center is selected, the client device 202 sets and authenticates a persistent control channel with the streaming service of the stream source 204, before using this control channel to subscribe to the real-time media stream. The client device 202 that is trying to subscribe to a real-time media stream typically first selects a nearby PoP. This selection takes the set of available regions as input and could be based, for instance, on the geographic or network location of the client device 202 or the response time of the service to a minimal request.

Figure 3:
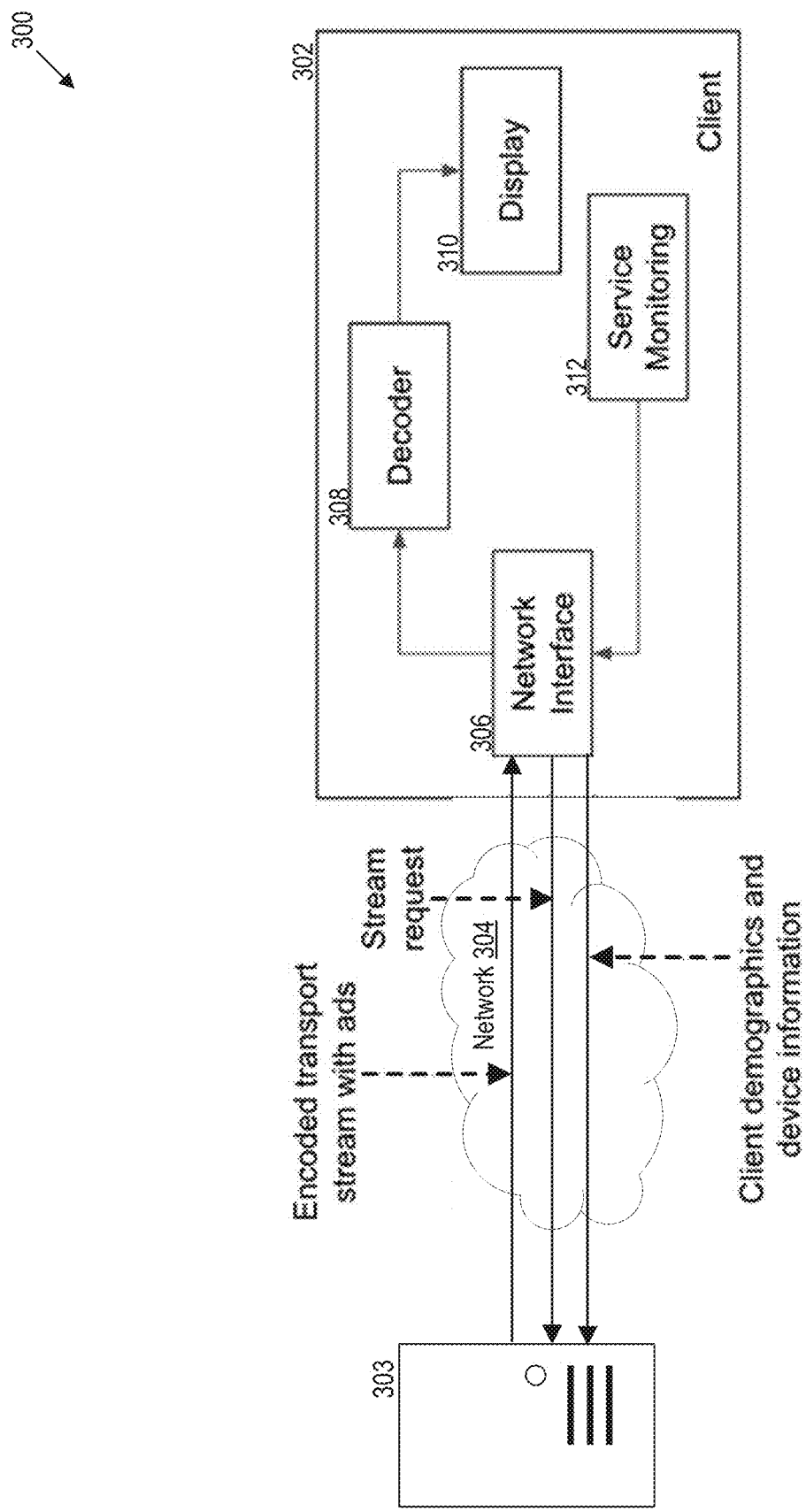
FIG. 3 is a block diagram that illustrates a client device capable of playing back real-time streaming media including a targeted content element inserted therein.

FIG. 3 is a block diagram 300 that illustrates a client device capable of playback of real-time streaming media that includes a content element targeted for a viewer. As shown, the client device 302 exchanges information with a server of a streaming service 303 over the network 304 (e.g., internet). The client device 302 has a network interface 306 to communicate signals to the streaming service 303 including a media stream request and a set of features that can be used for targeting content for a user of the client device 302. A service monitoring component 312 of the client device 302 communicates the media stream request and set of features through the network interface 306 to the streaming service 303 over the network 304. Examples of the set of features include client demographics and device information (e.g., type, location). The network interface 306 receives the encoded transport stream with targeted content elements from the streaming service 303. The encoded transport stream is processed by a decoder 308, and the decoded transport stream is then displayed on a display 310 of the client device 302.

Figure 4:
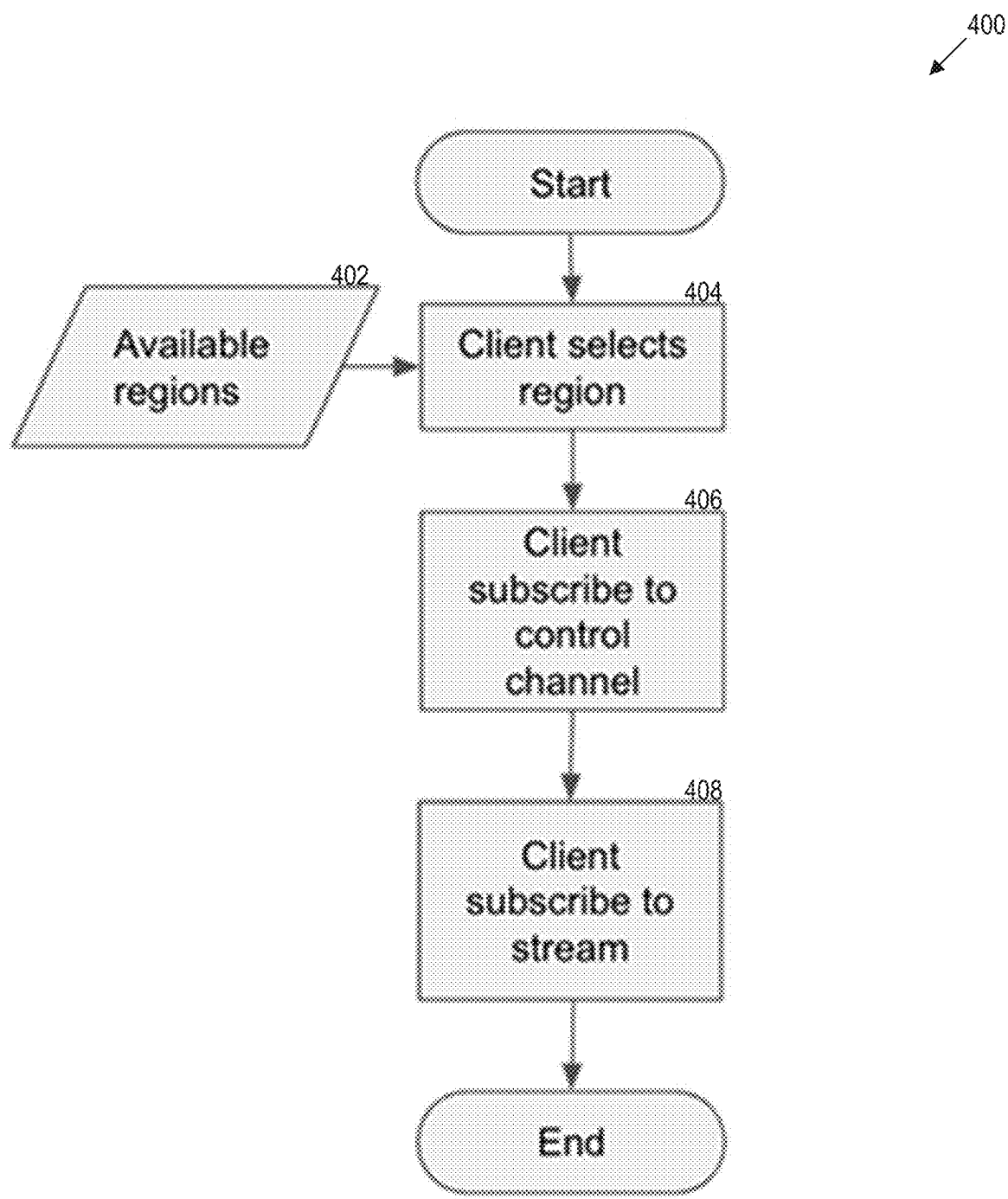
FIG. 4 is a flowchart that illustrates a subscription process of a client device to subscribe to a real-time media stream.

FIG. 4 is a flowchart that illustrates a subscription process 400 of a client device to subscribe to a real-time media stream. The flowchart is based on observations that an ordered sequence of multiple signals for the client device to subscribe to the real-time media stream can be extended to drive a process of selecting targeted content, transcoding the targeted content, and inserting the targeted content in the real-time media stream without hindering the real-time nature of the stream. The process 400 is used only for illustration and different embodiments of a real-time streaming service can adopt a different multi-step process that includes the basic steps of the process 400. Those steps include, at 402, the client device receives indications of one or more geographic regions that are available. At 404, the client device selects a geographic region from among the one or more regions. At 406, the client device subscribes to a control channel of a streaming service. At 408, the client device subscribes to the real-time media stream of the streaming service.

Figure 5:
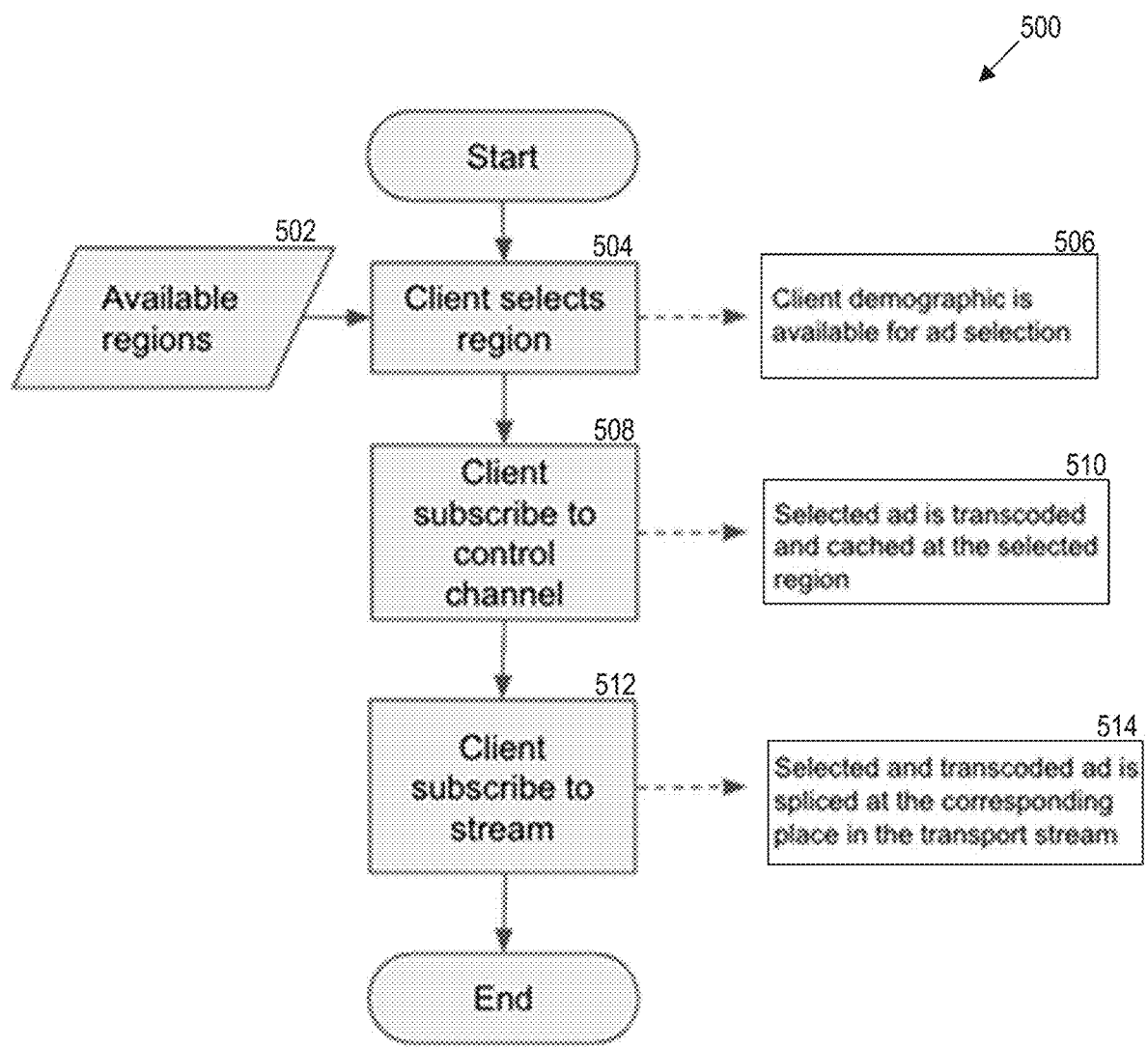
FIG. 5 illustrates a flowchart including a process that augments the subscription process of FIG. 4 to insert targeted content elements in a real-time media stream.

FIG. 5 illustrates a flowchart including a process 500 that augments the subscription process 400 to insert targeted content elements in a real-time media stream. In other words, the subscription process 400 is extended to illustrate steps of a content insertion process in an implementation of the present technology. The process 500 is initiated when a system (e.g., streaming service) receives a request from the client device to subscribe to a real-time media stream. In one example, the request is input to the client device by a prospective viewer of the real-time media stream. The real-time media stream can include splice points associated with positions that indicate cue-in or cue-out points for inserting content elements (e.g., at key frames).

At 502, one or more geographic regions are available for selection for the client device to designate a region to which the real-time streaming media will be communicated. In one example, the one or more geographic regions can be identified relative to a geographic location of the client device or its user.

At 504, the client device selects a geographic region from among the one or more geographic regions. In one example, the client device communicates an indication of the selected geographic region to the system. An example of the geographic region includes a region in which the client device is currently located or a location where the client device previously registered.

At 506, a set of features associated with a client device are communicated to the system. In one example, the set of features includes demographic information of a prospective viewer, an indication of a preference of the prospective viewer, and/or an indication of a behavior of the prospective viewer. The set of features are communicated relative to a first signal indicating the selected geographic region (e.g., the signal for 502). As such, the set of features are communicated to the system along with communicating the indication of the selected geographic region.

At 508, the client device subscribes to a control channel of a streaming service. The client device sets and authenticates a persistent control channel with the streaming service before using the control channel to subscribe to the real-time media stream.

At 510, the (targeted) content is selected, transcoded, and/or cached at a memory associated with the selected geographic region. The system selects the content element from among multiple content elements. In one example, the multiple content elements are identified and/or selected based on content of the real-time media stream and/or the set of features associated with the client device. As such, the content element is targeted for the prospective viewer. The content element is selected relative to a second signal for subscribing the client device to the control channel of the real-time media stream (e.g., the signal for 508).

In one example, the content element is an advertisement segment selected by an ad-insertion service in response to a request issued by a streaming service. The content element can be selected from the cache memory of the selected geographic region. In one example, the cache memory is pre-populated with content elements selected for insertion in real-time media streams prior to the client device subscribing to the real-time media stream.

The system can transcode the selected content element and store the transcoded content element in a cache memory of the selected geographic region. As shown, the content element is transcoded relative to a second signal for subscribing the client device to the control channel (e.g., the signal for 508). In another example, the content element is transcoded relative to a signal different from the second signal of the sequence of ordered signals.

At 512, the client device subscribes to the real-time media stream of a streaming service in accordance with the subscription process (e.g., subscription process 400).

At 514, the (targeted) content element is inserted in the real-time media stream. For example, a transcoded content element can be inserted in a cue in or cue out point of the real-time media stream. Inserting the content element in the real-time media stream thereby produces a modified real-time media stream. The content element is inserted in the real-time media stream relative to a third signal for subscribing the client device to the real-time media stream (e.g., the signal for 512).

The modified real-time media stream is then communicated to the client device. If the system is unable to timely select, transcode, or insert a first content element prior to a threshold event, a second content element can be selected for insertion in the real-time content stream in lieu of the first content element. For example, if an ad server does not respond with a targeted ad before the client has finished setting the control channel, or if the ad returned by the ad server has not been transcoded before the subscriber has subscribed to the stream, the system can select a more generic ad cached in the cache memory associated with the selected geographic region. As such, the first content element can be a targeted ad whereas the second content element is a generic ad.

Figure 6:
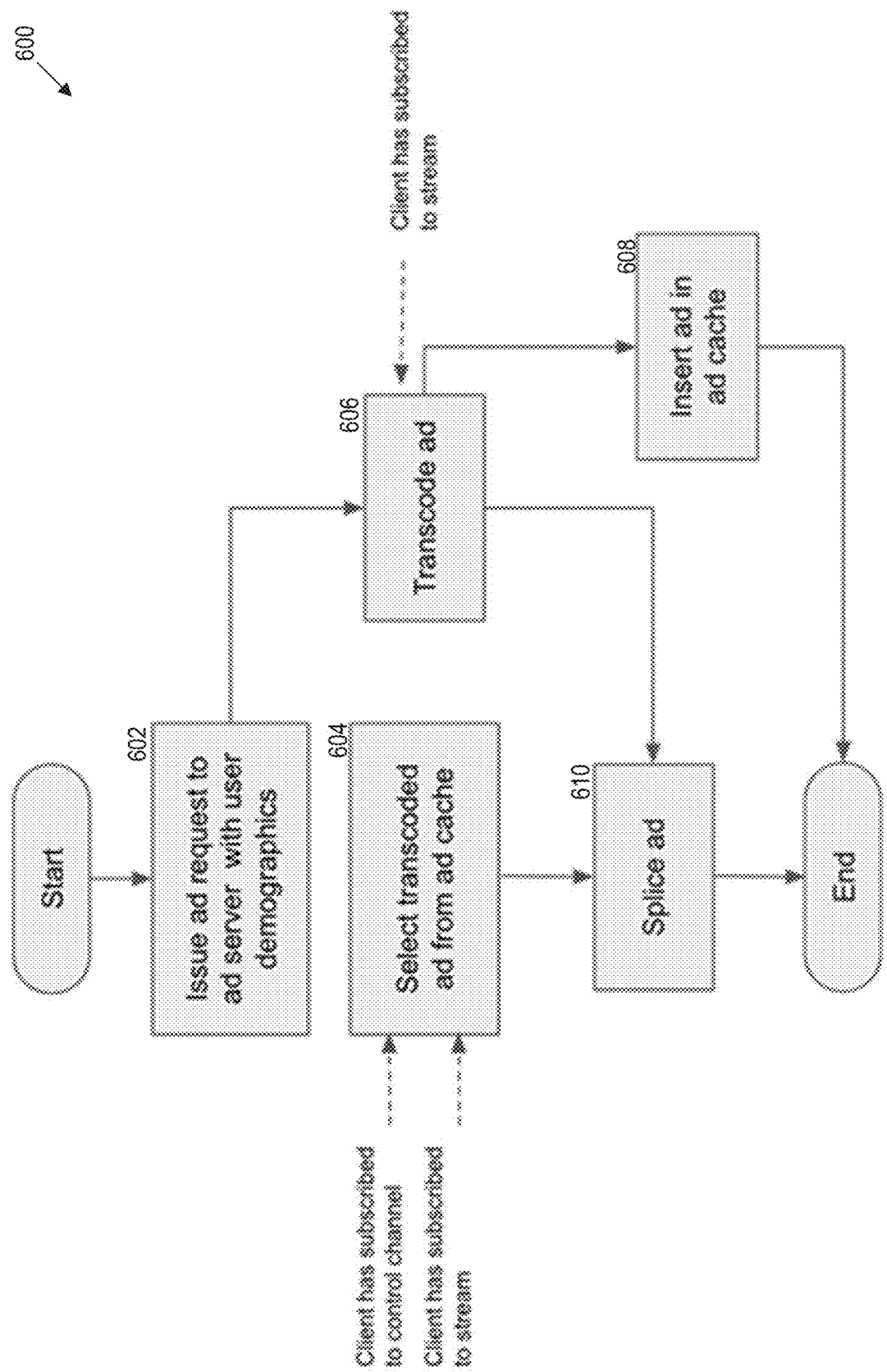
FIG. 6 is a flow diagram that illustrates processes for dynamically inserting content elements from different sources into real-time streaming media.

FIG. 6 is a flow diagram that illustrates a process 600 for inserting content elements including ads in real-time streaming media. For example, the process 600 can be performed by a streaming service for ad insertion in the real-time streaming media. In one embodiment, after a subscriber has initiated the process of region selection, making at the same time available their demographic information, an ad insertion manager can issue an ad request from the ad server at 602. At 604, if the ad server does not respond with the ad before the subscriber has finished setting the control channel, or if the ad returned by the ad server has not been transcoded before the subscriber has subscribed to the stream, the system can select a more generic, previously cached ad from the ad cache for insertion. Or else, once transcoded at 606, the unused ad can be inserted in the ad cache at 608. The ad insertion manager can issue ad requests, transcode and cache ads for later use ahead of a subscriber joining the real-time media stream. The cached ads will be available to use when indicated by the subscription process signals, as described earlier. The ad insertion manager can use the subscription process signals and track ad service past performance to select among alternative ad services, trading less beneficial services for timely ad delivery.

Although the disclosed embodiments describe a fully functioning method and system for content insertion in a real-time media stream, other equivalent embodiments exist. Since numerous modifications and variations will occur to those reviewing this description, the method and system is not limited to the exact construction and operation illustrated and disclosed. Accordingly, this description intends all suitable modifications and equivalents to fall within the scope of the embodiments.

Processing System

Figure 7:
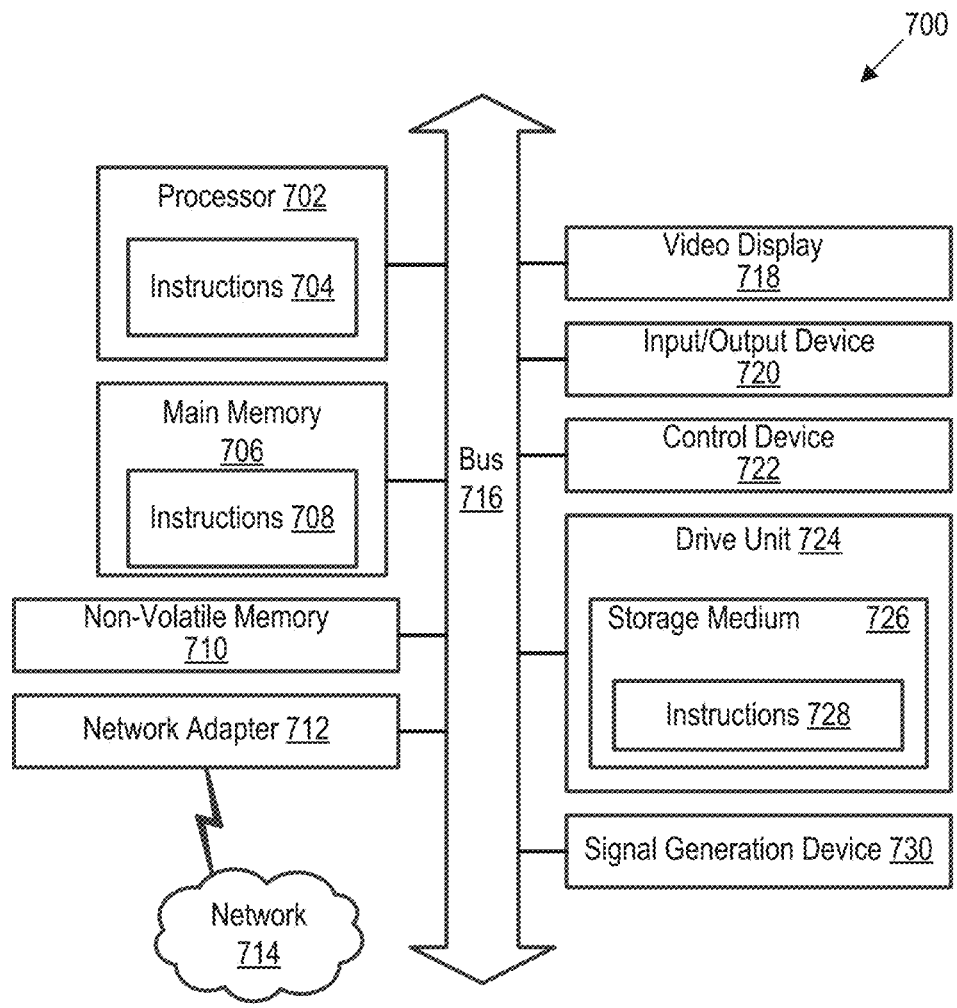
FIG. 7 is a block diagram that illustrates an example of a processing system in which at least some operations described herein can be implemented.

FIG. 7 is a block diagram illustrating an example of a processing system 700 in which at least some operations described herein can be implemented. For example, some components of the processing system 700 may be hosted on a streaming server, a client device, or any other device of FIGS. 1-6

The processing system 700 may include one or more central processing units ("processors") 702, main memory 706, non-volatile memory 710, network adapters 712 (e.g., network interface), video displays 718, input/output devices 720, control devices 722 (e.g., keyboard and pointing devices), drive units 724 including a storage medium 726, and signal generation devices 730 that are communicatively connected to a bus 716. The bus 716 is illustrated as an abstraction that represents one or more physical buses and/or point-to-point connections that are connected by appropriate bridges, adapters, or controllers. The bus 716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (i.e., "Firewire").

The processing system 700 may share a similar computer processor architecture as that of a desktop computer, tablet computer, personal digital assistant (PDA), smartphone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 700.

While the main memory 706, non-volatile memory 710, and storage medium 726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 728. The term "machine-readable medium" and "storage medium" shall also be taken to include any medium that is capable of storing, encoding, or carrying a set of instructions for execution by the processing system 700.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in a computing device. When read and executed by the one or more processors 702, the instruction(s) cause the processing system 700 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 710, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 712 enables the processing system 700 to mediate data in a network 714 with an entity that is external to the processing system 700 through any communication protocol supported by the processing system 700 and the external entity. The network adapter 712 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 712 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

In some embodiments, any suitable encoding protocol may be utilized. For example, encoding protocols H.264 or VP9 may be utilized and can apply to any combination of such protocols.

REMARKS

The foregoing description of various embodiments of the subject matter has been provided for the purposes of illustration and description. It is not intended to be exhaustive or to limit the subject matter to the precise forms disclosed. Many modifications and variations will be apparent to one skilled in the art. Embodiments were chosen and described in order to best describe the principles of the technology and its practical applications, thereby enabling those skilled in the relevant art to understand the subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following embodiments should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

The language used in the specification has been principally selected for readability and instructional purposes. It may not have been selected to delineate or circumscribe the subject matter. It is therefore intended that the scope of the technology be limited not by this Detailed Description, but rather by any embodiments that issue on an application based hereon. Accordingly, the disclosure of various embodiments is intended to be illustrative, but not limiting, of the scope of the technology as set forth in the following embodiments.

The invention claimed is:

1. A method for inserting a content element in a real-time media stream, the method comprising:
    receiving a set of features associated with a client device,
        wherein the set of features are received relative to a first signal indicating a geographic region selected for the client device;
    in response to a second signal for subscribing the client device to a control channel:
    (i) selecting the content element based on the set of features associated with the client device,
        wherein the control channel is configured to transmit control information for controlling real-time media streaming on a transport channel separate from the control channel;
    (ii) determining that transcoding the content element for inserting in the real-time media stream is realizable without causing delay in delivering the real-time media stream to the client device,
        wherein an alternative content element is available to insert in the real-time media stream when transcoding the content element would cause delay in delivering the real-time media stream to the client device;
    transcoding the content element for subscribing the client device to the control channel;
    in response to a third signal for subscribing the client device to the real-time media stream:
    (i) inserting the transcoded content element in the real-time media stream to thereby produce a modified real-time media stream,
        wherein the first signal is processed prior to the second signal that is processed prior to the third signal; and
    (ii) communicating the modified real-time media stream on the transport channel to the client device.

2. The method of claim 1 further comprising, prior to communicating the modified real-time media stream to the client device:
    receiving, from the client device, a request to subscribe to the real-time media stream,
        wherein the real-time media stream includes multiple splice points associated with positions that indicate cue-in or cue-out points, and
        wherein the content element is inserted in a splice point of the multiple splice points.

3. The method of claim 1 further comprising, prior to communicating the modified media stream to the client device:
receiving an indication of the geographic region selected from multiple geographic regions available for the client device,
wherein the content element is selected from among multiple content elements designated for the selected geographic region.

4. The method of claim 1 further comprising, prior to communicating the modified media stream to the client device:
storing the transcoded content element in a cache memory associated with the geographic region.

5. The method of claim 1, wherein the set of features associated with the client device comprises any of:
demographic information of a viewer of the real-time media stream;
an indication of a preference of the viewer; and
an indication of a behavior of the viewer.

6. The method of claim 1, wherein selecting the content element comprises:
selecting the content element from among multiple content elements,
wherein the multiple content elements are identified based on content of the real-time media stream.

7. The method of claim 1, wherein the content element is an advertisement segment, the method further comprising:
selecting an ad-insertion service configured to insert the advertisement segment in the real-time media stream.

8. The method of claim 1, wherein selecting the content element comprises:
selecting the content element from a cache memory designated for the geographic region.

9. The method of claim 8, wherein the cache memory is pre-populated with multiple content elements selected for insertion in real-time media streams prior to the client device subscribing to the real-time media stream.

10. At least one computer-readable storage medium, excluding transitory signals and carrying instructions, which, when executed by at least one data processor of a system, cause the system to:
receive a request to subscribe a client device to a real-time media stream,
wherein the request is input to the client device by a prospective viewer of the real-time media stream;
receive a set of features associated with the client device along with information of a geographic region of the client device;
subscribe the client device to a control channel of a streaming service,
wherein the control channel is configured to transmit control information for controlling real-time media streaming on a transport channel separate from the control channel;
select a content element from among multiple content elements based on demographic information of the prospective viewer and the geographic region of the client device;
determine that transcoding the content element for inserting in the real-time media stream is realizable without causing delay in delivering the real-time media stream to the client device,
wherein an alternative content element is available to insert in the real-time media stream when transcoding the content element would cause delay in delivering the real-time media stream to the client device;
transcode the selected content element;
store the transcoded content element on a cache memory of the geographic region;
splice the transcoded content element in the real-time media stream to thereby produce a modified media stream; and
subscribe the client device to the modified media stream on the transport channel.

11. The at least one computer-readable storage medium of claim 10, wherein the system is caused to:
receive a request to subscribe another client device to another media stream;
retrieve the transcoded content element from the cache memory; and
splice the transcoded content element from the cache memory in the other media stream; and
subscribe the other client device to the other media stream including the transcoded content element.

12. The at least one computer-readable storage medium of claim 10, wherein the multiple content elements each include advertisement content managed by an advertisement service.

13. A client device comprising:
a network interface;
a display device;
a decoder;
a processor; and
a memory storing instructions that, when executed by the processor, cause the client device to:
communicate, using the network interface, a request to a subscription service for real-time streaming content captured in real-time;
communicate, using the network interface, a first signal indicating a demographic information of a user of the client device;
in response to a second signal for subscribing the client device to a control channel:
select a content element based on the demographic information of the user of the client device,
wherein the control channel is configured to transmit control information for controlling the real-time streaming content on a transport channel separate from the control channel;
receive, using the network interface, an encoded version of the real-time streaming content,
cause the subscription service to determine that transcoding the content element for inserting in the real-time media stream is realizable without causing delay in delivering the real-time media stream to the client device,
wherein an alternative content element is available to insert in the real-time media stream when transcoding the content element would cause delay in delivering the real-time media stream to the client device;
in response to a third signal for subscribing the client device to the real-time media stream:
decode, using the decoder, the encoded version of the real-time streaming content to produce a decoded streaming content including the transcoded content element,
wherein the first signal is processed prior to the second signal that is processed prior to the third signal; and cause display, on the display device, of the decoded streaming content including the transcoded content element communicated on the transport channel to the client device.

14. The client device of claim 13, wherein the content element includes an advertisement selected based on the demographic information of the user and a geographic region of the client device.

15. A method comprising:
receiving, from a client device, a request to subscribe to a real-time content stream,
  wherein the real-time content stream includes one or more splice points, and
  wherein the one or more splice points are associated with positions in the content stream and indicate cue-in or cue-out points;
augmenting multiple ordered signals of a process to subscribe the client device to the real-time content stream,
  wherein augmenting the multiple ordered signals includes:
    receiving a set of features of a user associated with the client device;
    receiving a signal for subscribing the client device to a control channel,
      wherein the control channel is configured to transmit control information for controlling the real-time content stream on a transport channel separate from the control channel;
    in response to receiving the signal, selecting a content element configured for insertion in the real-time content stream based on the set of features;
    determining that transcoding the content element for inserting in the real-time media stream is realizable without causing delay in delivering the real-time media stream to the client device,
      wherein an alternative content element is available to insert in the real-time media stream when transcoding the content element would cause delay in delivering the real-time media stream to the client device;
    transcoding the content element for subscribing the client device to the control channel;
    inserting the transcoded content element relative to the cue-in or cue-out points of the real-time content stream to thereby produce a modified content stream; and
    communicating the modified content stream on the transport channel to the client device.

16. The method of claim 15, wherein augmenting the multiple ordered signals comprises:
issuing a request to an advertisement service for advertisement content;
in response to the request to the advertisement service, receiving the selected content element including an advertisement; and
storing the transcoded content element on a cache storage for insertion in real-time media streams.

17. The method of claim 16, wherein augmenting the multiple ordered signals comprises:
upon subscribing another client device to the control channel for the real-time content stream, retrieving the transcoded content element from the cache storage; and
inserting the transcoded content element in the real-time content stream for the other client device.

18. The method of claim 16 further comprising:
determining that the advertisement service is unable to timely select, transcode, or insert a first content element in the real-time content stream prior to a threshold event; and
selecting a second content element for insertion in the real-time content stream in lieu of the first content element.

19. The method of claim 18:
wherein the first content element is targeted for the user, and
wherein the second content element is a generic content element that is not targeted for the user.

* * * * *